Patented June 18, 1929.

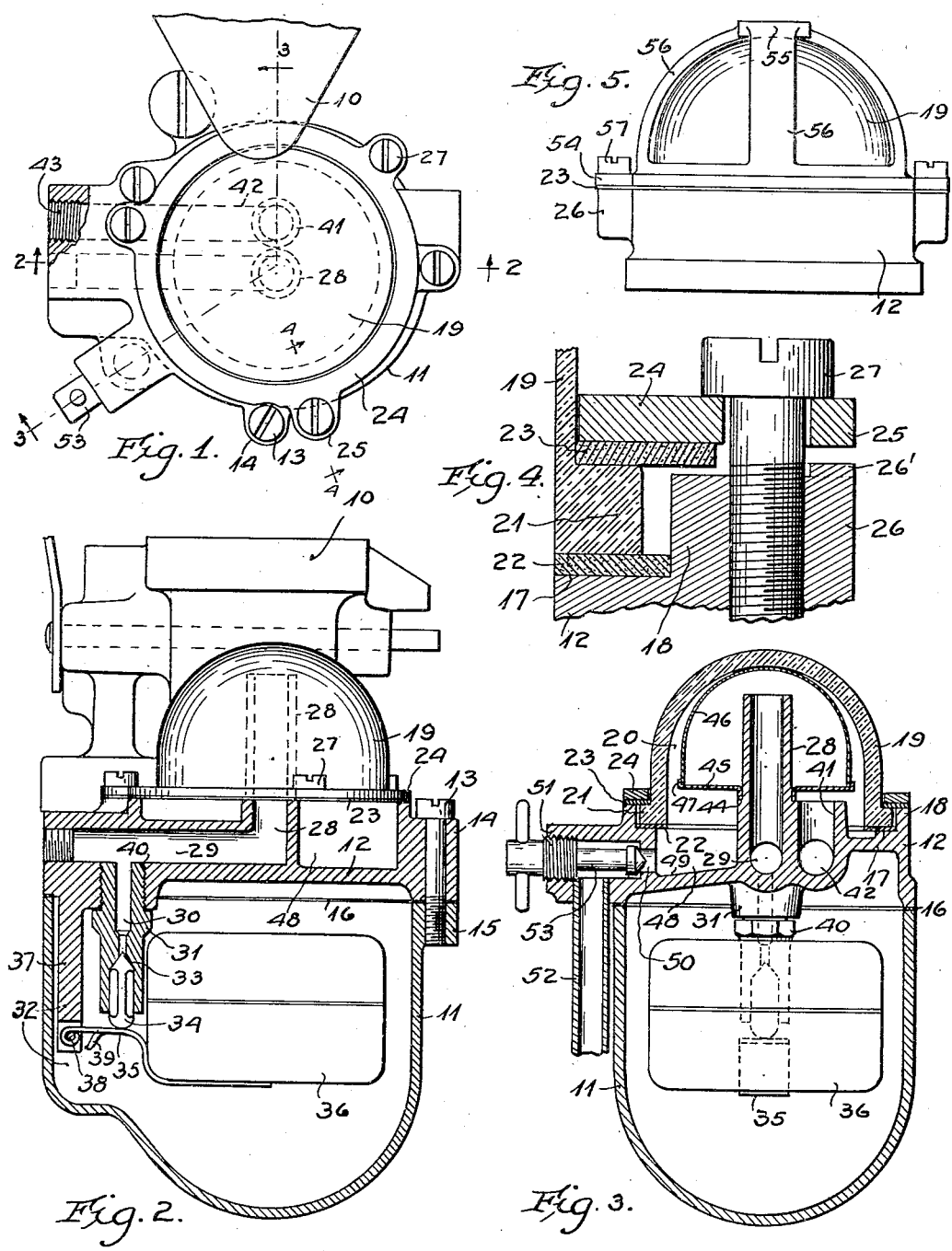

1,717,875

UNITED STATES PATENT OFFICE.

MILTON E. CHANDLER, OF CHICAGO, ILLINOIS, ASSIGNOR TO STROMBERG MOTOR DEVICES CO., OF CHICAGO, ILLINOIS, A CORPORATION OF ILLINOIS.

FILTER STRUCTURE.

Application filed January 29, 1927. Serial No. 164,502.

My invention relates to filter structures particularly adaptable for association with carburetors for filtering the fuel before it is used by the carburetor.

One important object of the invention is to provide a filter structure which is supported on, or forms part of, the cover for the fuel reservoir. Another object is to provide an arrangement in which the fuel reservoir cover forms a support for the filter structure and also for the inlet valve and its controlling float.

Another object is to make the upper walls of the filter structure transparent so that the filtering operation is visible. Another object is the provision of a transparent dome forming the side and top walls of the filter chamber, together with improved means for locking and sealing the dome on the cover.

Another object is the provision of improved means for collecting the strained out foreign particles and impurities and for draining them from the filter chamber, together with means for preventing such strained matter from flowing back into the fuel supply stream.

On the drawings:—

Figure 1 is a plan view of a carburetor structure showing the filter structure applied thereto;

Figure 2 is a sectional view on plane 2—2 of Figure 1;

Figure 3 is a sectional view on plane 3—3 of Figure 1;

Figure 4 is an enlarged sectional view on plane 4—4 of Figure 1; and

Figure 5 is an elevational view of the cover structure showing a modified arrangement of securing means for the dome of the filter structure.

Although my improved filter structure may be utilized by itself or in connection with any container or reservoir, I have shown it associated with the fuel reservoir of a carburetor. The carburetor shown comprises the body 10 and the float chamber or reservoir 11. A frame or base 12 forms a cover for the float chamber, screws 13 extending through bosses 14 on the frame and bosses 15 on the reservoir serving to detachably hold the frame in closure position on the reservoir, preferably with a gasket 16 interposed.

The frame 12 is of circular shape and has the annular ledge or seat 17 surrounded by the flange 18. A glass dome 19 rests on the seat 17 and with the frame 12 forms the filter chamber 20. At its lower edge the dome has the external flange 21 and between the flange and the seat 17 is placed a gasket 22 of material such as cork. The thickness of the gasket and the height of the flange 21 is preferably such that when the dome is placed on the gasket the flange 21 will project a short distance above the flange 18. Another gasket or cork ring 23 is then placed on top of the flange 21 and overhanging the flange 18, and on top of this gasket 23 is applied a flat ring 24 preferably of steel. The steel ring has extensions 25 registering with the bosses 26 on the frame 12, screws 27 extending through openings in the extensions and threading into the bosses, and by means of these screws the steel ring will be drawn downwardly towards the flange 18. When the ring is first drawn down it will compress the gasket 22 between the dome flange and the seat 17, and the upper gasket between the ring and the dome flange. After such primary compression the upper gasket will come into engagement with the flange 18 and then the gasket will be compressed between the ring and the flange. The compression of the upper gasket between the ring and the flange 18 is limited by the engagement of the outer ends of the extensions 25 with the bosses 26, or as shown abutments 26' may be provided on the bosses 26 for limiting the downward movement of the ring 24. By thus limiting the movement of the clamping ring and thereby the pressure on the glass dome 9, the strain on the glass will be limited sufficiently to prevent breaking or cracking of the glass.

A standpipe 28 rises from the bottom of the frame 12 and extends axially upwardly in the filter chamber to within a short distance of the top of the dome. The outlet 29 at the lower end of the standpipe extends through the frame 12 to the vertical passageway 30 in the lug 31 depending from the frame 12 at one side of the float chamber in the bay or recess 32. The passageway 30 extends to the valve seat 33 in the valve chamber formed in the lower end of the lug 31. In this chamber is the valve plug 34 having the conical upper end for cooperating with the valve seat and being engaged at its rounded lower end by the arm 35 extending from the float 36 in the float chamber, the arm being pivoted on the extension 37 on the frame 12 as indicated at 38, the arm having the stop extension 39 for cooperating with the frame 37 to limit the downward swing of the float. The part 31 which has the passageway 30 and forms the valve chamber may be integral with the frame 12, or as shown it may be a separate piece having screw threaded engagement with the frame as indicated at 40 (Figure 2). The fuel valve and its controlling float are, therefore, carried by the cover structure 12.

Adjacent to the standpipe 28 is a shorter pipe 41 from the bottom of which a passageway 42 extends through the frame and the lug 43 thereon, the lug being threaded for the attachment of a fuel supply duct coming from a fuel supply tank as, for example, a vacuum tank.

The standpipe 28 has the annular ledge 44 for supporting the circular shelf 45, this shelf snugly encircling said pipe and extending over beyond the fuel inlet pipe 41. The shelf 45 supports the filter member or screen 46, this screen being substantially semi-spherical or dome shaped and confined at its lower edge to the shelf by the shelf flange 47. At its lower end the filtering member is displaced from the dome 19, but at its upper end it is engaged by the dome and thereby held against and in place on its supporting shelf 45.

The fuel from the supply source enters the pipe 41 and flows over the top thereof into the filter chamber 20, the fuel flowing upwardly around the periphery of the shelf 45, and before reaching the standpipe 28 the fuel must flow through the filter member 46 to be strained and freed from dirt or other foreign particles and moisture, the intercepted particles and material falling downwardly into the sump or pocket in the frame 12 below the filter chamber, the sump having the inclined floor 49 leading to the outlet valve passageway 50 in the valve frame 51 extending from the frame 12. A drain pipe 52 extends from the valve frame and a suitable valve 53 controls the flow from the sump outlet 50 into the drain pipe. After a period of operation of the filter structure the filtered out particles and impurities may be thus readily drained off. As the dome 19 is transparent, the filtering operation can be observed and the quantity of sediment noted at any time and drained off before it becomes excessive. The inlet pipe 41 extends a sufficient distance above the filterage sump so that filtered material cannot re-enter the fuel supply stream. As the shelf 45 overhangs the pipe 41 it will be impossible for any filtered out particles to drop into the pipe, but they will be directed into the sump along whose bottom they will flow towards the outlet 50. By removing the clamping ring 24 the dome 19 can be raised and the filter member 46 removed and cleaned. By removing the screws 13 the cover frame 12, together with the filter structure supported thereon and the fuel valve with its controlling float, and the drain valve and pipe, can be removed from the reservoir and inspection, adjustment, repairs, and cleaning can be readily accomplished. The limitation to the drawing up of the screws 27 will prevent undue straining and breaking of the glass dome flange, although sufficient pressure will be exerted on the cork gaskets to insure perfect seal against escape of fuel.

Figure 5 shows a modified arrangement for holding the glass dome of the filter chamber in place. A cage or shield comprises the annular base 54, the top 55, and the bars 56. The dome 19 is set down on the gasket 22 in the same manner as described in connection with Figure 3, and then the cage is applied with its top 55 against the top of the dome and the screws 57 are drawn up, the pressure against the top of the dome then causing it to be firmly seated on the seat 17 with the compressed gasket 22 sealing the filter chamber against leakage of fuel. The cage structure also protects the glass dome against blows and injury and is an arrangement which is desirable where the carburetor is more or less exposed.

Other modifications are possible without departing from the scope and spirit of my invention.

I claim as follows:—

1. In combination, a chamber having a seat for reception of a gasket, a compressible gasket on said seat, a frangible closure for the chamber provided with a peripheral flange seating on the gasket, a compressible gasket seating on said flange, a clamping member extending about the closure member and seating on the second gasket, means for securing said clamping member to the chamber and for forcing it toward said flange and clamping the flange between the gaskets, and means limiting movement of the clamping member toward the flange.

2. In combination, a chamber having an upwardly projecting flange rabbeted in its inner face, a gasket seating in said rabbet, a frangible closure member having an outer peripheral flange fitting into the rabbet of said chamber flange and seating on the gasket, a second gasket seating on the flange of the closure member, the gaskets possessing appreciable compressibility, a clamping member seating on the second gasket, means for forcing the clamping member toward the flange of the closure member and for securing it to the chamber, and means limiting movement of the clamping member in such direction.

3. In combination, a chamber having an upwardly projecting flange rabbeted in its inner face, a gasket seating in said rabbet, a frangible closure member having an outer peripheral flange fitting into the rabbet of said chamber flange and seating on the gasket, a second gasket seating on the flange of the closure member, the gaskets possessing appreciable compressibility, and the second gasket projecting above the flange of the chamber when the gaskets are in normal uncompressed condition, a clamping member seating on a second gasket, means for securing the clamping member to the chamber and forcing it toward the flange of the closure member, such movement of the clamping member being limited by the flange of the chamber when the pressure exerted by the clamping member on the gaskets and the flange of the closure member reaches a predetermined value.

In witness whereof, I hereunto subscribe my name this 25th day of January, 1927.

MILTON E. CHANDLER.